Dec. 27, 1927.
J. A. HOWARD
MANUFACTURE OF RUBBER SOLES AND ANALOGOUS ARTICLES
Filed Dec. 30. 1926    2 Sheets-Sheet 1
1,654,001
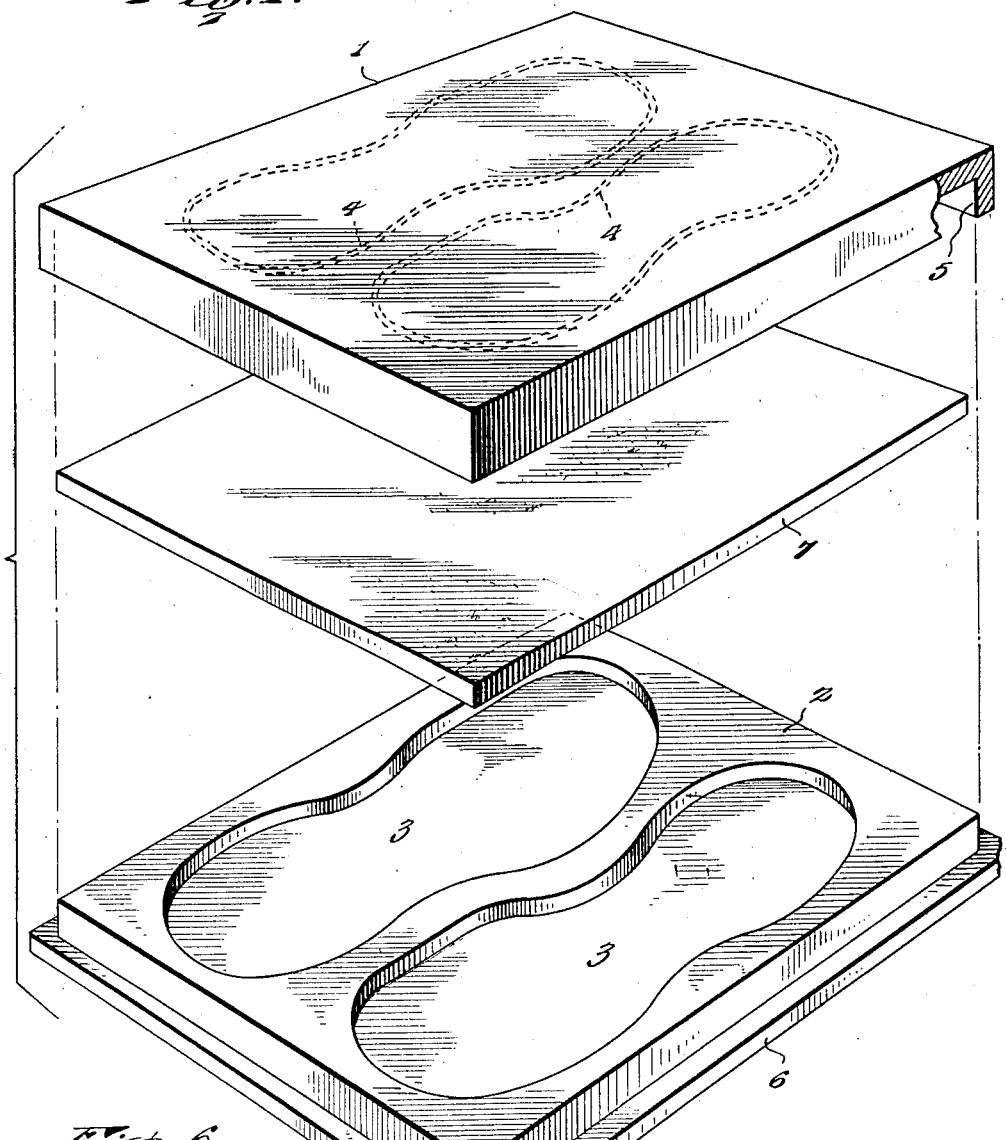
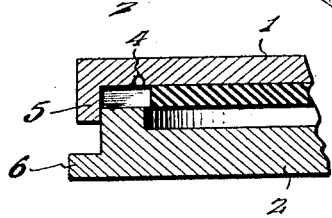
Inventor
John A. Howard.
By Lacey & Lacey, Attorneys Dec. 27, 1927.
1,654,001
J. A. HOWARD
MANUFACTURE OF RUBBER SOLES AND ANALOGOUS ARTICLES
Filed Dec. 30, 1926    2 Sheets-Sheet 2
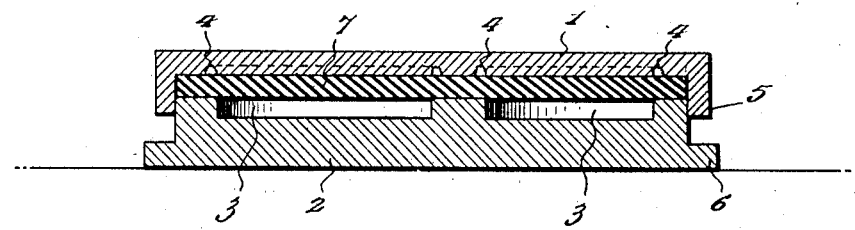
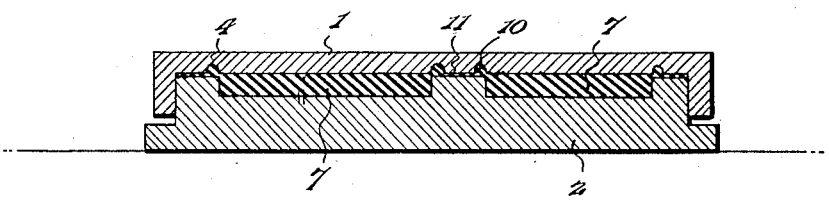
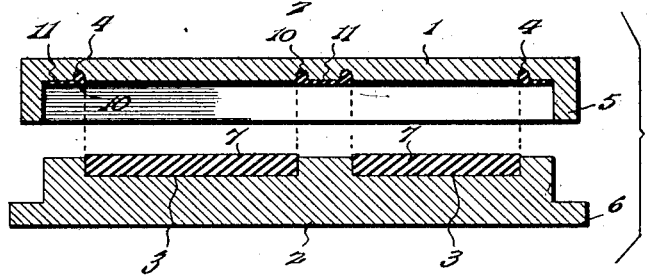
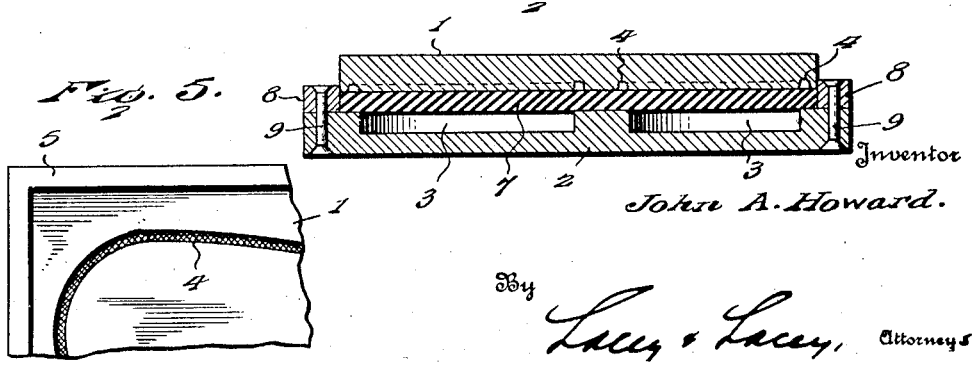
Inventor
John A. Howard.
By Lacey & Lacey, Attorneys Patented Dec. 27, 1927.

1,654,001

UNITED STATES PATENT OFFICE.

JOHN A. HOWARD, OF JOHNSON CITY, NEW YORK.

MANUFACTURE OF RUBBER SOLES AND ANALOGOUS ARTICLES.

Application filed December 30, 1926. Serial No. 158,044.

The primary object of this invention is the conservation of material, the saving of time and the utilization of space in the manufacture of rubber soles and kindred articles.

In practicing the invention a mold is provided, the same consisting of two parts, one part containing the mold space into which the rubber is forced and the other part having a channel conforming to the outline of the mold cavity to receive the excess of rubber as a result of the molding operation when pressure is exerted to bring the parts of the mold together to shape the article to be formed. The channel is exterior to and adjacent the mold cavity and its wall is roughened to cause the surplus rubber received therein to stick and as a result, when the mold is separated, the surplus stock is removed from the article which comes from the mold clean without necessitating any subsequent trimming.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which, Figure 1 is a perspective view of a mold embodying the invention, the parts being separated and the piece of rubber to be molded being shown therebetween.

Figure 2 is a sectional view of the mold after the parts having been brought together and preliminary to the application of pressure to force the material into the mold cavities.

Figure 3 is a view similar to Figure 2, after the parts of the mold have been subjected to pressure to force the rubber into the mold cavities.

Figure 4 is a sectional view of the mold as it appears with the parts separated after the molding operation, showing the removal of the surplus material.

Figure 5 is a fragmentary view of that part of the mold in which the channel is formed for receiving the surplus material.

Figure 6 is a fragmentary sectional view of a portion of the mold and provision for supplying the material in an amount sufficient to fill the mold cavity and allowing for an overflow of the small surplus.

Figure 7 is a sectional view similar to Figure 2 of a modification.

Corresponding and like parts are referred to in the following description and designated in the several views of the drawings by like reference characters.

The mold comprises parts or members designated by the numerals 1 and 2 respectively. The part 2 has the mold space or cavity 3 formed therein, the same conforming to the shape of the article to be molded. In the present instance the mold cavity 3 conforms to the outline of a shoe sole, and in the event of the mold being designed to form a number of articles at one operation the mold cavities 3 are disposed in reverse order, so as to economize in space. This also results in a minimum waste of material because of the narrow space or part separating adjacent mold cavities, as indicated most clearly in Figure 1. The shape of the mold cavity will depend upon the outline of the article to be molded and the number of mold cavities or spaces will depend upon the capacity of the mold and the number of articles to be formed by the mold at one operation.

The part 1 is provided with a channel or groove 4 which conforms to the outline of the mold cavity to receive the surplus material incident to the molding operation when the parts of the mold are pressed together. The channel or groove 4 is positioned adjacent the mold cavity and exterior thereto so as to receive the surplus material without the formation of any fin between the article when molded and the surplus amount of material pressed into the groove or channel 4. The wall of the groove or channel 4 is roughened, as indicated most clearly in Figure 5, the purpose being to cause the surplus material to adhere or stick thereto so as to be separated from the article when the parts of the mold are separated, as indicated most clearly in Figure 4, thereby obviating any subsequent trimming of the article which comes from the mold clean and free from any web or fin.

The mold illustrated in Figure 1 has the part 1 formed with a depending flange 5 to snugly embrace the outer sides of the part 2, thereby confining the material and insuring the accurate positioning of the parts when pressed together, so that the circumscribing groove or channel 4 will assume a correct position with reference to the mold cavity. The part 2 of the mold is formed with an outwardly directed flange 6 upon which the flange 5 rests when the two parts of the mold are pressed together. In the modification shown in Figure 7 the part 2 of the mold has a guard 8 applied to its marginal portion and secured thereto by rivets 9 or other suitable fastening means. The guard 8 assures the proper positioning of the parts of the mold when pressed together. This guard 8 also serves to confine the material 7 when the mold is subjected to pressure to bring the parts 1 and 2 together to force the rubber into the mold cavity.

The material 7 usually consists of a piece of sheet rubber, of a size to insure the filling of the mold cavity when the parts of the mold are brought together, due allowance being had for a slight surplus or waste, which is received in the channel or groove 4 and between the opposing faces of the mold, as indicated most clearly in Figures 3 and 4. That portion of the material overflowing into the channel or groove 4 provides a bead 10 and that part remaining between the opposing faces of the mold forms a web or fin 11. This is indicated most clearly in Figures 3 and 4. When the mold is separated after the molding operation the surplus material represented by the bead 10 and the web or fin 11 is detached from the article molded, as indicated most clearly in Figure 4, this being assured by the sticking of the bead 10 to the roughened wall of the groove or channel 4. The article thus molded as it leaves the cavity is clean and free from projecting parts which usually require subsequent trimming.

While it is preferred to cut the material from a sheet, it is observed that it may be supplied to the mold in any preferred and determinate way, the amount supplied being sufficient to fill the mold cavity and allow for a slight overflow to insure the complete filling of the mold cavity. A plurality of molds are provided and as each mold is supplied with the proper amount of material it is stacked, thereby admitting of a number of molds being simultaneously subjected to hydraulic pressure and a curing of the rubber, thereby enabling the invention to be effected in an economical way and on a practical basis.

Having thus described the invention, I claim:

1. In the manufacture of molded articles, a mold having a molding cavity and a circumscribing channel for reception of surplus material, the wall of said channel being roughened to cause the surplus material to adhere thereto, whereby to assure the separation of the surplus material from the molded article when separating the mold.

2. A mold comprising complementary parts, the one having a flange to embrace the outer side of the other for confining the material and assuring proper positioning of the parts when brought together, one of said parts having the molding space formed therein, and the other part being provided with a circumscribing channel for receiving the surplus material, the wall of said channel being roughened to cause the surplus material to stick thereto to insure the article coming from the mold clean without necessitating subsequent trimming.

3. A mold comprising complementary parts, one of which is provided with a flange adapted to fit the other, one of said parts being provided with spaced mold cavities and the other with channels conforming to the shape of the mold cavities and having their walls roughened to receive and retain the surplus material during the molding operation.

In testimony whereof I affix my signature.

JOHN A. HOWARD. [L. S.]